US010777010B1

(12) United States Patent
Patel et al.

(10) Patent No.: US 10,777,010 B1
(45) Date of Patent: Sep. 15, 2020

(54) DYNAMIC ENVIRONMENT MAPPING FOR AUGMENTED REALITY

(71) Applicant: Amazon Technologies, Inc., Reno, NV (US)

(72) Inventors: Pratik Patel, San Mateo, CA (US); Sidharth Moudgil, Mountain View, CA (US); Richard Schritter, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 26 days.

(21) Appl. No.: 15/923,982

(22) Filed: Mar. 16, 2018

(51) Int. Cl.
  *G06T 19/00* (2011.01)
  *G06T 15/50* (2011.01)

(52) U.S. Cl.
  CPC ............ *G06T 19/006* (2013.01); *G06T 15/50* (2013.01)

(58) Field of Classification Search
  None
  See application file for complete search history.

(56) References Cited

U.S. PATENT DOCUMENTS

| | | | | |
|---|---|---|---|---|
| 9,959,905 | B1 * | 5/2018 | Sevigny | H04N 5/23238 |
| 10,032,306 | B2 * | 7/2018 | Oh | G06T 13/80 |
| 2005/0285878 | A1 * | 12/2005 | Singh | H04M 1/72544 |
| | | | | 345/633 |
| 2005/0289590 | A1 * | 12/2005 | Cheok | G06Q 30/02 |
| | | | | 725/37 |
| 2008/0098206 | A1 | 4/2008 | Naoi | |
| 2009/0128552 | A1 | 5/2009 | Fujiki et al. | |
| 2013/0141434 | A1 | 6/2013 | Sugden et al. | |
| 2014/0125668 | A1 * | 5/2014 | Steed | G06T 15/50 |
| | | | | 345/426 |
| 2017/0180713 | A1 | 6/2017 | Trail | |
| 2017/0295356 | A1 * | 10/2017 | Abbas | H04N 5/2251 |
| 2018/0084257 | A1 * | 3/2018 | Abbas | H04N 19/176 |
| 2018/0146193 | A1 * | 5/2018 | Safreed | G06F 3/012 |

(Continued)

FOREIGN PATENT DOCUMENTS

CN   106940897   7/2017

OTHER PUBLICATIONS

Szeliski et al., "Creating Full View Panoramic Image Mosaics and Environment Maps." Proceedings of the 24th Annual Conference on Computer Graphics and Interactive Techniques. ACM Press/Addison-Wesley Publishing Co., 1997.

(Continued)

*Primary Examiner* — YuJang Tswei
(74) *Attorney, Agent, or Firm* — Hogan Lovells US LLP

(57) ABSTRACT

An environment map, such as a cube map, can be dynamically generated for a scene using image data captured by a device executing an augmented reality (AR) application. The current orientation of the device, along with field of view information for the camera, can be used to determine a portion of the environment map that corresponds to the captured image data. The image data can be used to fill in that portion, and subsequent image data captured for other orientations used to fill the remaining portions. The generated environment map can then be used to render AR content to be displayed with a live view of the scene. This can include determining the illumination and/or reflections effects for the AR content. The rendered AR content can be displayed as an overlay with respect to a live view of the scene.

20 Claims, 10 Drawing Sheets

(56) References Cited

U.S. PATENT DOCUMENTS

2018/0182160 A1* 6/2018 Boulton ................ G06T 15/506
2018/0190007 A1* 7/2018 Panteleev ............. A63F 13/212
2019/0012828 A1   1/2019 Jung et al.
2019/0228568 A1   7/2019 Wu et al.

OTHER PUBLICATIONS

Non-Final Office Action issued in U.S. Appl. No. 15/923,939 dated Jun. 27, 2019.
Ex Parte Quayle Action issued in U.S. Appl. No. 15/923,874 dated Jul. 9, 2019.
Notice of Allowance issued in U.S. Appl. No. 15/923,939 dated Nov. 15, 2019.
Notice of Allowance issued in U.S. Appl. No. 15/923,874 dated Sep. 25, 2019.

* cited by examiner

DYNAMIC ENVIRONMENT MAPPING FOR AUGMENTED REALITY

BACKGROUND

The widespread adoption of portable computing devices, such as smartphones and tablet computers, has resulted in a corresponding increase in the amount and types of electronic content available to users. This includes the providing of augmented reality (AR) content, where image data can be captured for a location and a computing device can render content such that the content appears, at least as displayed on a screen of the device, that the content exists in that physical location. As the device moves or changes orientation, the view of the content can change accordingly, being rendered as if the content corresponds to actual three-dimensional objects being captured by the camera of the device at the appropriate location and angle. Conventional approaches to rendering AR content do not provide a full sense of realism, however, as the rendering of the content typically does not match the appearance of the physical surroundings. This can be due to incorrect lighting or shading for current conditions, as well as the improper placement of shadows and other such visual aspects that take the user out of a true augmented reality experience.

BRIEF DESCRIPTION OF THE DRAWINGS

Various embodiments in accordance with the present disclosure will be described with reference to the drawings, in which.

DETAILED DESCRIPTION

Figure 1A:
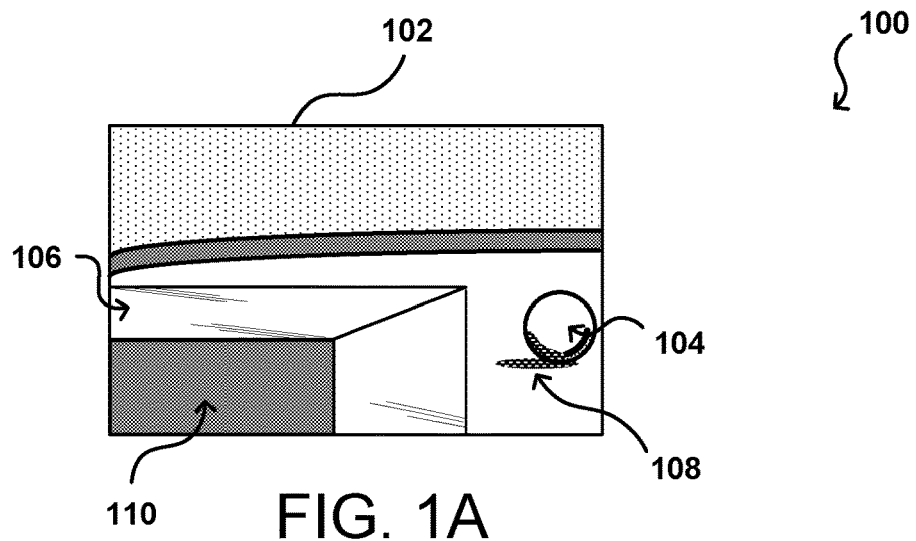
FIGS. 1A, 1B, and 1C illustrate example displays of a scene that can be provided in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the presentation of dynamically rendered content, such as augmented reality (AR) content. In particular, various approaches provide for the dynamic generation of an environment map, such as a cube map, for purposes of determining lighting effects to apply to AR content relative to a live view of a physical scene. When determining position data for rendering AR content, a device will often capture image data of the surrounding scene, including visible objects and other visual aspects of the environment. This image data can be used to dynamically build an environment map, such as a cube map, for the scene. The current orientation and position of the device, along with the field of view of the camera, can be used to determine a portion of the environment map that corresponds to the captured image data. The image data can be used to fill in that portion, and subsequent image data captured for other positions and/or orientations can be used to fill the remaining portions of the environment map in order to generate a three-dimensional map of the scene that is representative of the current lighting conditions. The environment map can then be used to render more realistic AR content to be displayed with a live view of the scene. This can include, for example, determining the illumination and/or reflections of the AR content to determine the specular colors for the relative pixels. The rendered AR content can then be displayed as an overlay with respect to a live view of the scene, with the realistic lighting from the cube map causing the AR content to appear with a sense of realism to correspond to a physical object present in the scene.

Various other functions can be implemented within the various embodiments as well as discussed and suggested elsewhere herein.

There can be various situations where it may be desirable to render or provide augmented reality (AR) content to one or more viewers through one or more electronic devices. For example, a user might utilize an AR interface or multiple players might be playing a multiplayer game wherein AR content is displayed to each of the players through a respective computing device. As known for AR content, the view and content displayed on each device can be a function of the location of the device in at least some embodiments, as well as the orientation (or changes in orientation) of the respective device. This enables each device to function as an augmented window on the world, where the augmented content will appear to exist in the real world when viewed through the display of the device, typically laid over a live camera view. The scale, angle, and location of the augmented content can move as appropriate with the change in location and/or orientation of the computing device.

FIG. 1A illustrates an example image 100 of captured image data for a scene that can be utilized in accordance with various embodiments. In this example, image data is captured that represents various objects visible in the scene. As used herein, a "scene" refers generally to a collection of objects, such as foreground and background objects, visible in a physical location. These objects can be positioned in any location relative to a computing device executing the augmented reality application, such as may require a portable device to rotate or otherwise change orientation in order for the objects to fall within a field of view of the relevant camera of the portable device. A camera can capture images of portions of the scene that will include representations of any foreground or background objects contained within a field of view of the camera. Objects contained in the field of view can change as the orientation, zoom, or other aspects of the camera change, such that the portion of the scene represented in the captured image data will change as well. In the image 100 displayed in FIG. 1A, the scene can include objects in a location such as a park or gaming field. This can include content such as a field, seating, lights, and other background objects, and in this object also includes a view of a physical ball 104 and a physical box 106 present in the scene and positioned with in the field of view of the camera. As illustrated, objects such as the ball 104 and the box 106 demonstrate lighting effects similar to the other objects in the scene, as the objects are illuminated using the same real-world lighting. As illustrated, however, these lighting sources are not, or at least not all, visible in the image data. Further, for real world applications there typically will be no distance information or model information for the lighting of the scene, which can also change over time.

The inability to have accurate lighting information can make it difficult to render augmented reality (AR) content that appears as if it corresponds to a physical object located in the real world scene. For example, the image 120 illustrated in FIG. 1B has an AR object 122 rendered to appear to be standing on the box 106 in the scene. The AR object 122 is rendered as an overlay or additional image layer with respect to image data captured for the scene. In various embodiments the image data can represent a "live" camera view wherein the image data displayed represents data currently being captured by the camera, with some amount of latency due to the capture and display process. It should be understood that the AR content does not need to be a separate layer or object but can be rendered into the image or otherwise generated with respect to the representation of the scene to appear as if the AR content is physically present in the scene.

As discussed in more detail later herein, information about the scene can be determined that will influence how the AR content is rendered. This can include, for example, determining distance and scale information for a location in the scene for which the AR content is to be rendered, and rendering the AR content with the appropriate size, scale, angle, and other such aspects. In various embodiments, an attempt can be made to match a lighting or appearance of the AR content to that of the scene in the image data. This can include, for example, determining aspects such as brightness or contrast levels of the scene and then using these levels for rendering of the AR content. Other aspects of the scene can be used as well, such as to determine a direction of lighting or type of shadow that can be applied to the AR object to make the AR object more closely match the appearance of the scene in the image.

Figure 1B:
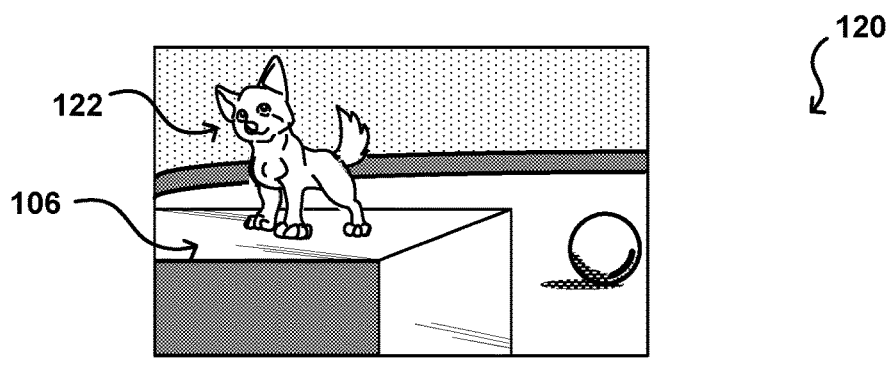

There are various limitations to such an approach, however. While attempts can be made to match the color, brightness, and other aspects of the scene, it will be difficult using conventional approaches to properly light or shade the AR object 122 such that it appears realistic in the displayed image. As illustrated in the example of FIG. 1B, the AR object 122 does not have shading that matches the other objects in the scene. Further, the object does not cast realistic shadows that match the other objects in the scene. For at least these reasons, the AR object 122 will stand out as a computer-generated object, which will negatively impact the realism and overall AR experience in many instances.

Figure 1C:
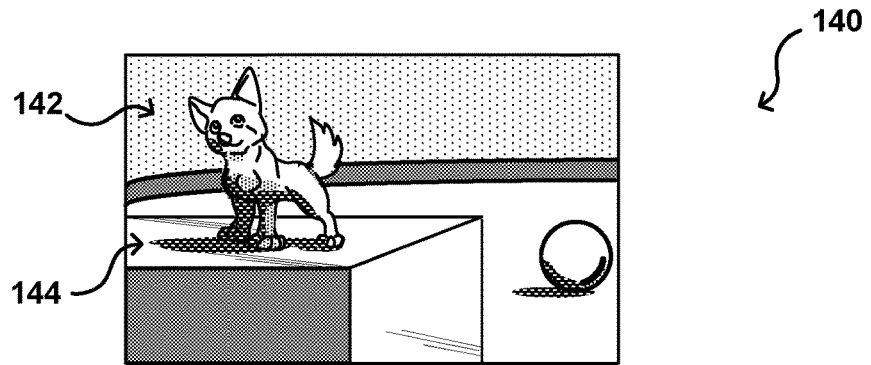

If lighting information for the scene were available, then lighting, shading, shadow generation, and other visual aspects could take advantage of that information to make the object appear more realistic, such as the object 142 illustrated in FIG. 1C. The effects of the bright overhead light can be seen in the shading on the object 142, which matches the other objects in the scene. Further, the strong shadow 144 cast, as well as the direction or location of the shadow, can also match the shadows cast by other objects in the scene. Color reflections and other visual aspects can also be generated for the object 142, and with respect to the object (such as reflections of the object), that more closely match those of the physical objects in the scene. As mentioned, however, it can be difficult to obtain the appropriate lighting information for a scene, particularly since a user can be located in any location, at any time, under any lighting conditions.

Accordingly, approaches in accordance with various embodiments can provide for the dynamic generation of an environment map for a current scene for which AR content is to be rendered. A camera of a device will be capturing image data of the scene for use in determining how to render the AR content. This image data, along with position and/or orientation information, can be used to generate an environment map, such as a cube map, that can serve as a relatively lightweight (i.e., requiring little memory or storage space) representation of the sources of lighting, colors, and reflections for a scene. The cube map, or available portions of the cube map, can then be used to assist with shading determinations for various AR objects to be rendered for a specific scene under a specific set of lighting conditions. Various other options can be provided as well within the scope of the various embodiments.

An environment map, such as a cube map or sphere map, comprises a virtual projection of the scene onto the inside of a three-dimensional object. This can include, for example, capturing image data for a scene from a specific location, then virtually projecting the image data for the scene onto the six sides of the virtual cube. This can serve as a virtual mapping or representation of the surrounding environment or objects of the scene. The image data can be stored as a single representation or set of representations, where each individual representation may correspond to a side of the cube, among other such options. Cube maps in at least some embodiments are used instead of sphere maps for reasons such as simplicity of creation and storage size, as well as the avoidance of significant issues with image distortion and viewpoint dependency. Further, many hardware devices can more efficiently process and utilize cube maps for rendering applications. Cube maps can be used with content rendering for purposes of projective texture mapping, where the cube maps can be used to project images corresponding to various lighting and colors onto virtual objects in the scene, where those virtual objects may include overlays onto real world objects. Such an approach provides for the generation of realistic lighting for AR objects, and other such rendered content, without the need to build or obtain complex lighting models for a scene.

Figure 2A:
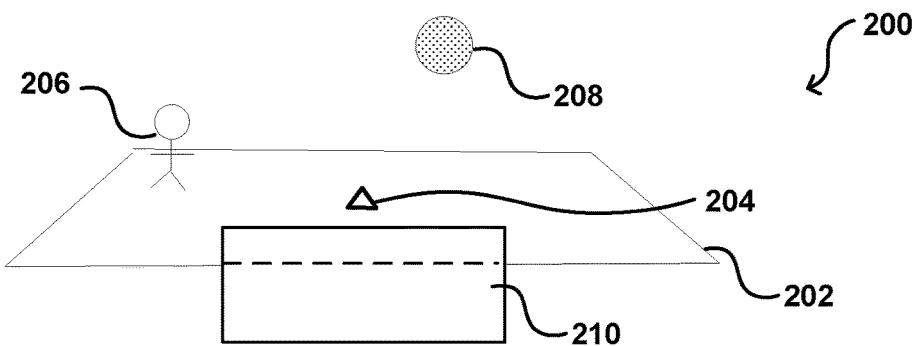
FIGS. 2A, 2B, and 2C illustrate an example approach to generating a cube map for a scene that can be utilized in accordance with various embodiments.
Figure 2B:
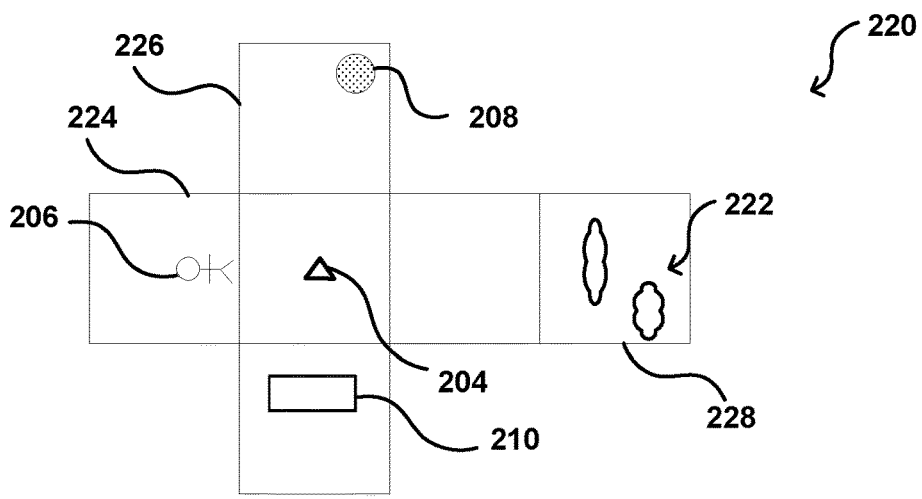
Figure 2C:
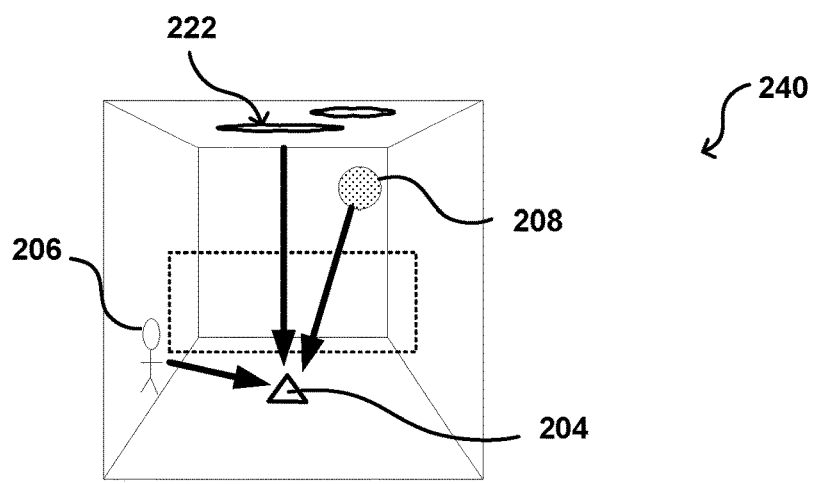

FIGS. 2A through 2C illustrate an approach to generating a cube map for a scene that can be utilized in accordance with various embodiments. FIG. 2A illustrates objects in a scene 200 that can be accounted for in a generated cube map. In this example, the scene 200 has a determined field or scene layout 202, which may correspond to a physical space or determined portion of such a space. The field 202 may include the region around a reference point 204 in which augmented reality objects may be rendered through an AR application executing on a computing device, which may be coincident with the reference point 204. The view of the scene from the reference point 204 may include several real-world or physical objects, which may be contained within, or outside, the determined field 202. For example, a person 206 is identified to be within the field 202, but the sun 208 and a blue wall 210 are located outside the field. The placement of these objects internal or external to the field may not make a difference in at least some embodiments, as long as those objects are visible in at least some direction from the reference point 204 and thus may impact the lighting, shadows, or reflections of objects contained within the field 202.

In the example scene 200 of FIG. 2A, there is a person 208 to the left of the reference point in the plane of reference of the figure. The sun 208 is located behind the reference point 204, or further away from the viewer of the figure. The blue wall 210 is intended to be illustrated as being in front of the reference point, or closer to a viewer of the figure. Thus, a camera of a computing device would need to rotate, or change orientation, about one-hundred eighty degrees to capture image data for the three objects. Each of these objects, however, can impact the appearance of an object in the scene due to lighting, reflections, or other visual aspects.

Accordingly, a cube map 220 can be generated that provides a representation of these objects, as well as their approximate locations relative to the reference point 204. As illustrated, a left face 224 of the cube (once assembled) can include image information representing the person 206 who was standing to the left of the reference point 204. Similarly, the rear face 226 can include image data for the sun 208 behind the reference point and a top face 228 can include image data for clouds 222 in the sky above the reference point, among other such objects. Image data can be captured from the reference point in each direction, and the image data used to populate the respective face of the cube map. When the cube map is virtually assembled, as in the situation 240 illustrated in FIG. 2C, the representations of the object can be in locations on the cube such that if a camera were placed at the reference point 204 and pointed in a specific direction, the camera would obtain a view of the scene or environment that substantially corresponds to the portion of the scene in that direction. Thus, any contribution of the objects on the lighting, shading, or reflections of an AR object rendered at that location, or another position in the scene, can be determined using the data from the cube map. The image data for the cube map can include the appropriate colors at the appropriate brightness and intensity, and with the appropriate levels of contrast, etc., such that lighting effects generated based on the image data will closely mimic those of the real objects in the physical scene. As illustrated in FIG. 2C, the cube map provides a relatively accurate three-dimensional representation of the scene from the perspective of the reference point. An AR object placed at the reference point 204 would reflect the light from the objects or regions of the cube map, and the reflection components back to the virtual camera of the AR application can be used to determine the specular color for the relevant pixels of the AR object, using shading, reflection, or other techniques known or used for rendering a virtual object in a computer graphics environment.

The cube map can also be thought of as providing a three-dimensional representation of the lighting state for the scene. "Lighting state" as used herein refers to any aspect of an environment, physical or virtual, that may impact the illumination of any portion of a scene represented in image data, or any augmented reality object rendered into such a scene. This can include, for example, not only active light sources but objects that may have some impact on the lighting or reflections of an object rendered in the scene. This can also include additional information for each identified object, such as a color, brightness, range or set of active states, intensity, variability, light type (e.g., LED or fluorescent), etc. The lighting state in some embodiments can also include information such as time and location, which can be used to determine information about the lighting state for different environmental conditions. In other embodiments the time and location information can be used to determine information about the image data to be used for one or more faces of the cube map. Various other lighting state data can be utilized or represented as well as discussed and suggested elsewhere herein with respect to the various embodiments.

Figure 3A:
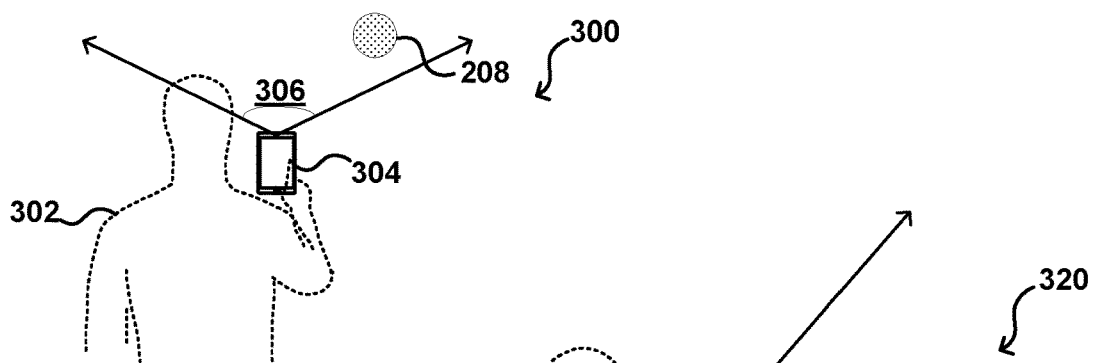
FIGS. 3A, 3B, 3C, 3D, and 3E illustrate an example approach to building up a cube map for a scene that can be utilized in accordance with various embodiments.
Figure 3B:
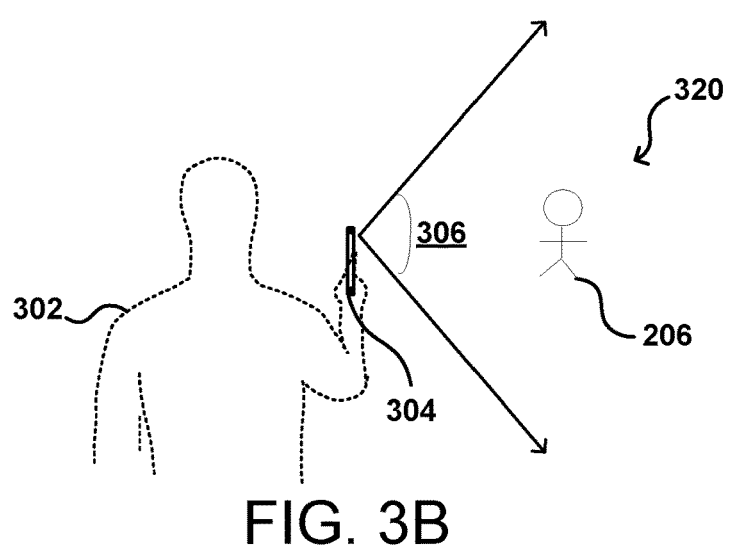

As mentioned, in many instances an environment map, such as a cube map, will be used for an augmented reality application executing on a computing device. In order to make the AR appear as realistic as possible, the cube map can be generated on, or for, the specific computing device. An example approach is illustrated in FIGS. 3A through 3E. In the example situation 300 of FIG. 3A a user 302 is utilizing a portable computing device 304, such as a smartphone or tablet, to access the AR content. It should be understood that other AR-capable devices, such as AR goggles or a headset, can be used alone or in conjunction with such a computing device for such purposes. The computing device 304 can capture image data for objects within a field of view 306 of an active camera of the device. In FIG. 3A, the image data would include a representation of the sun 208 which is within the field of view 306 of the camera at that orientation. In the orientation of FIG. 3A the camera would have a primary axis that is orthogonal to the plane of the figure. If this is determined to be a default orientation, for example, then this view could correspond to a first face of the cube map, such as where the primary axis of the camera when capturing the image data is orthogonal to the virtual face of the cube map.

Figure 3C:
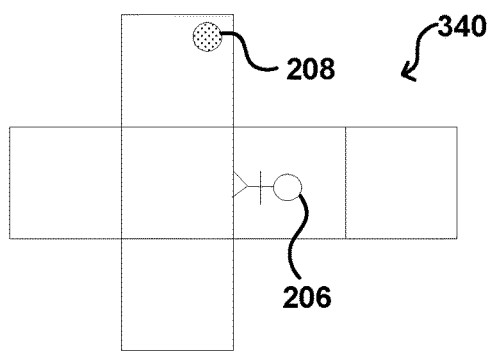
Figure 3D:
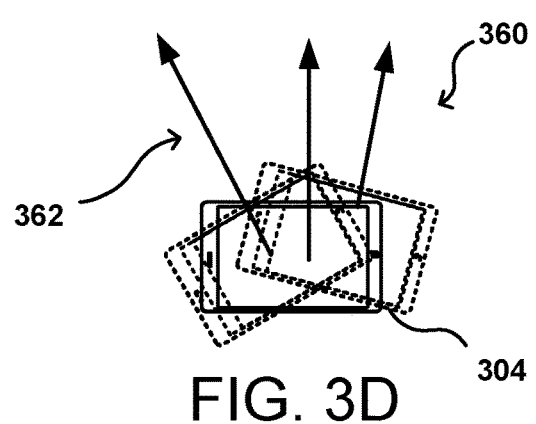
Figure 3E:
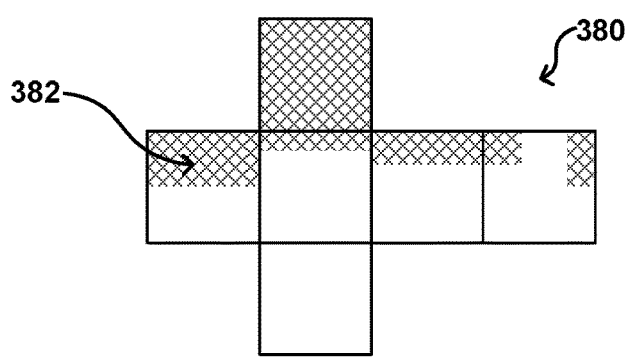

There might be a person 206 located to the right of the computing device 306 that is not in the field of view 306 of the camera when the computing device is in the first orientation. While using the AR application the user 302 might be caused to rotate or otherwise change the orientation of the computing device 306 by approximately ninety degrees until the orientation of the computing device causes the person 206 to be within the field of view of the camera. In this example, the primary axis of the camera would be in the plane of the figure. The camera could capture image data at this orientation, and that image data could then be used for the right face of the cube map. An example cube map 340 using such image data is illustrated in FIG. 3C, where the sun 208 is represented on the rear face and the person 206 represented on the right face, once the cube map is virtually assembled. Using such an approach, the cube map can be generated by capturing an image for each of the six faces, or at least five of the faces not including the bottom face, when the orientation of the computing device causes the corresponding object in that direction to be within the field of view of the camera.

In many instances, however, the computing device will not change orientations by full ninety degree rotations in different directions. As illustrated in the example situation 360 of FIG. 3D, device orientation changes during a game will tend to be toward a default orientation, or "forward" from a specific point in many instances, with less-than-ninety degree rotations of the device during use of the application. If the image data were captured only at ninety (or one-hundred eighty) degree rotations, then the cub map might only have information for the rear face, or other face corresponding to the default or primary orientation. This can result in less than optimal results, as only lighting or colors from a certain direction will be accounted for in the process. Accordingly, approaches in accordance with various embodiments can attempt to build up the cube map over time with new or updated image data that may not correspond to a single face or cube direction. For example, a change in orientation can be determined for a computing device or AR peripheral, for example, such as by using a sensor on the device. If it is determined that the device is in an orientation that was not previously utilized during this AR session, that will imply that at least some new image data is being captured that is not currently represented in the cube map. Accordingly, the new image data can be used to "paint" or fill in the respective portions of the cube map corresponding to the current orientation. The result for a particular point in time may correspond to a cube map 380 such as the one illustrated in FIG. 3E. In this example there are portions 382 of the cube map with image data that has been captured by the camera of the computing device. The amount of the cube map that includes image data can depend at least in part upon the orientations of the device for which image data was captured. As illustrated, this can include most if not all of the face of the default or primary direction, and portions of the adjacent faces corresponding to movement of the device. This can enable the cube map to be built up for relatively small changes in orientation over time, and enables at least some information to be obtained for the other faces even in the absence of large rotations or orientation changes.

Various approaches can be used for applying lighting effects to a rendered object in augmented reality. A rendering application can perform various lighting calculations for each pixel of an object to be rendered. This can include calculating both a diffuse color and a specular color in some embodiments. The diffuse color represents the true color of the object under pure white light, and is considered to be the color of the object itself rather than a reflection of light. The specular color refers to the brightness or color of reflections from a surface. As an example, a blue metal ball may have the same diffuse color at all pixel locations, as the ball is of a single, continuous color. Various locations on the ball may have a different specular color, however, such as may result in the primary reflection of a point light source from the ball appearing to be almost white due to the reflection. While it may be possible to determine the diffuse color for an AR object to be rendered, it can be difficult to determine the appropriate specular colors for the pixels of the object without accurate lighting information for the scene. Cube maps provide a relatively straightforward way to determine appropriate specular contribution values for an object to be rendered. Cube maps provide direction, color, and intensity data that can be used to calculate the specular color for a given pixel of an object, using information such as the surface orientation (or surface normal) for that particular pixel location. Approaches for using pixel maps to determine pixel shading are known in the art and, as such, will not be discussed herein in further detail. The cube map can function as an environment texture that can be applied globally across everything in the scene.

In many instances, a user will execute the AR application repeatedly in certain environments. For example, many users have one or two locations where they typically play or utilize an AR application, such as a game room, family room, or bedroom, etc. The cube map can be stored on the device and reused for later sessions, at least as an initial cube map to provide initial lighting information for the scene. In some embodiments an image can be captured for the scene to determine current lighting conditions, which can be used to adjust the cube map data for the current conditions. The stored image data can then be updated over time with more recent data to provide a more accurate and current version of the cube map. As will be discussed later herein, if multiple users use the same area or region for accessing AR content then these cube maps can also potentially be shared among users, at least to serve as a starting point until sufficient information is captured to provide a current cube map for the location. A cube map also provides ambient field information as well, rather than information about point light sources as may be provided by a conventional light map or model. The cube map is able to provide the color components of various objects in the scene which can contribute to proper lighting effects, particular for shiny or metal objects that are highly reflective. While the blue wall discussed earlier is not a true light source, it may have a significant impact on the appearance of shiny objects in the scene that will reflect the blue light from the wall.

As mentioned, the AR application can obtain orientation information from the computing device, such as may be provided by a sensor or component such as an electronic compass, inertial sensor, accelerometer, and the like, and can translate the orientation to a portion of the cube map that corresponds to the field of view of the camera at that orientation. This can be used to determine which images, or portions of the image, to use for the cube map. In some embodiments, a minimum new orientation angle must be detected before capturing or using new image data, such as at least three degrees from a prior orientation. The image information used can be only to the new portion of the image data, or the image data for the field of view can be merged or stitched into the current cube map to provide a more current representation. In some embodiments translation movements (as determined using GPS or iBeacon, etc.) can be accounted for as well. The cube map is a three dimensional representation, and the position can be considered along with the orientation to map the field of view of the camera onto the cube map, in order to determine the appropriate pixels of the cube map to which to apply the image data. The size and orientation of the cube can be determined based at least in part upon information about the size and layout of the scene, as well as an initial orientation or field of view of the camera, but also can vary dynamically over time in some embodiments as aspects of the scene change or the computing device moves to new areas, among other such options.

In some embodiments the stitching of the images together and mapping to the cube map can be performed on the computing device itself. In other embodiments the data may be sent across a network to a stitching or environmental mapping service, for example, that can perform the stitching and other image processing and return the cube map data to the device. Any of a variety of different stitching algorithms can be used that can take partially overlapping images and generate a larger image that is relatively seamless. This can include processing the images to register the images and blend the overlapping or corresponding pixel values, among other such processes. Such an approach can provide advantages as image processing can be resource intensive, such that it may be more advantageous to process the images off a mobile computing device or AR hardware. Such an approach can utilize a significant amount of bandwidth, however, and can introduce latency such that the remote processing approach may not be optimal or appropriate for all situations. In some embodiments there can be point data captured by device that can be provided with the image and orientation data in order to generate a more accurate cube map for the scene. In some embodiments an attempt can be made to reduce or minimize the amount of data sent across the network, such as to only send the new data and up to a maximum amount of overlapping data, only sending data when at least a minimum orientation change threshold (say at least three degrees) has been satisfied, only updating at specific intervals, etc. Various heuristics can be used to send only the information needed to help fill out the cube map for the current scene and/or current conditions.

In some embodiments the size or resolution of the cube map can also vary. For example, AR applications with highly reflective objects in bright conditions may require relatively high resolution cube maps to generate visually acceptable reflections on AR objects. For applications with mostly matte objects or low lighting, much lower resolution cube maps may be utilized as the general color and direction of object used to generate reflections may be significantly more important than a precise representation of those objects. Various other determinations can be used as well, such as the speed of the AR application, one or more user-specified settings, or capabilities of the device performing the rendering. In some embodiments the cube map may start out at a relatively low resolution and fill in with higher resolution data over time as additional image information becomes available. In some embodiments where there is insufficient information to build out a full cube map, a low resolution estimate can be generated using the information currently available for the various faces. For example, an average color, brightness, or other aspect of the faces near the top edge can be used to generate a default top face to be used for reflections. Similarly, information about the side faces might be used to generate a default back face, such as where the game field is grass and it can be inferred that the corresponding portion of the back face should be grass as well. Various processing approaches such as down sampling, filtering (e.g., Gaussian filtering), and blurring can also be used to reduce the amount of data as well as to improve the appearance of reflections by reducing noise or sharp features in the cube map. The various image processing aspects can be tunable in at least some embodiments to balance image quality with speed and resource requirements.

In some embodiments, scene data can correspond to any appropriate location or region, as may correspond to a closed or otherwise defined space. Within this space may be a defined a gameplay field. This may correspond to, for example, a race track, sporting field, or fighting arena, among other such options. It should be understood that the gameplay field can be real and/or virtual, such as may correspond to an actual physical space having physical components, or can correspond to a determined region of a floor (or another such surface or area) where aspects of the field are virtual and only displayed through augmented reality content, among other such options. In such an example there may be multiple players, or viewers, viewing augmented reality content in the game field (or other scene) using a respective augmented reality device. These devices can be any appropriate devices capable of displaying augmented reality content, such as may include smart phones, tablet computers, smart glasses or contacts, AR goggles, and the like. In some embodiments the AR content will be rendered over a live camera view captured by the device and displayed on a display screen, such as on a smart phone, but in other embodiments the content may be displayed over an actual view, such as for smart glasses. In various embodiments the devices will have at least some type of position and/or orientation determination mechanism, such as a global positioning system (GPS) sensor or electronic gyroscope, which can enable the view to be determined in such a way as to render the AR content with an appropriate angle, scale, and rotation, etc.

Each device can have a respective field of view that corresponds to a specific portion of the scene. For each device, only AR content corresponding to locations within that field of view will be rendered and displayed, at any given time, by a display of that device. In order to determine the angle and scale, as well as the point of reference for the field of view, the location of the device can also be determined. As mentioned, this can be determined using a GPS-based approach, or can use an iBeacon or triangulation-based approach, among others known or used for device location determination. The location information can help to determine the location of each device in the space, with respect to the gameplay field scene, and with respect to the other devices.

In order to make the AR content appear to be as realistic as possible, it can be desirable in many situations to further cause the rendered objects to appear to be positioned on, or with respect to, actual surfaces in the scene. This can include, for example, being positioned on a track, field surface, tabletop, or other object or element (physical or virtual) in the scene. Further, it can be desirable that these objects are all of the appropriate scale and location with respect to each other, and that these relationships remain consistent unless intentionally varied within the game or content presentation. In order to provide such functionality, it can be desirable to map, model, or otherwise generate an accurate representation of the scene, so that the content can be rendered appropriately with respect to that representation. While in some instances the scene may be a fixed and well-known set of objects that does not change, in other instances the scene may not be well known or may be able to vary throughout the game. In other embodiments the position and/or orientation of a respective device may be unable to be determined with sufficient accuracy to prevent any noise or error from being injected into the AR content as rendered.

It therefore can be desirable in at least some embodiments to determine the distance to various objects, locations, surfaces, and/or points in the gameplay field, or other appropriate area, for each individual device, such that the AR content is rendered and displayed appropriately for that specific device based on the current location and orientation. This can include, for example, capturing image data using a rear facing camera and analyzing that image data using a computer vision algorithm to identify the locations of specific types of surfaces, shapes, points, objects, or other such elements in the scene. Various algorithms can attempt to recognize various features and/or anchor points which can be used to identify surfaces, for example, which can be used as a reference for rendering AR content. Various other approaches can be used as well, as may include structured lighting, stereoscopic imaging, ultrasonic image, LIDAR scanning, and the like. Many portable computing devices or other consumer electronics may not have these and other such sensors or mechanisms, and thus may need to rely upon cameras or more basic data capture mechanisms.

In various embodiments, the scene data to be analyzed from the various devices will correspond to positions of features detected from image or other data captured using a camera or other such sensor or component on each respective device. As illustrated in the example image 400 of FIG.

Figure 4A:
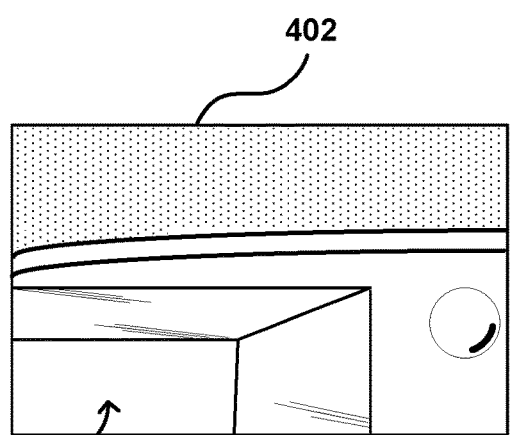
FIGS. 4A, 4B, 4C, and 4D illustrate an example approach to rendering augmented reality content that can be utilized in accordance with various embodiments.
Figure 4B:
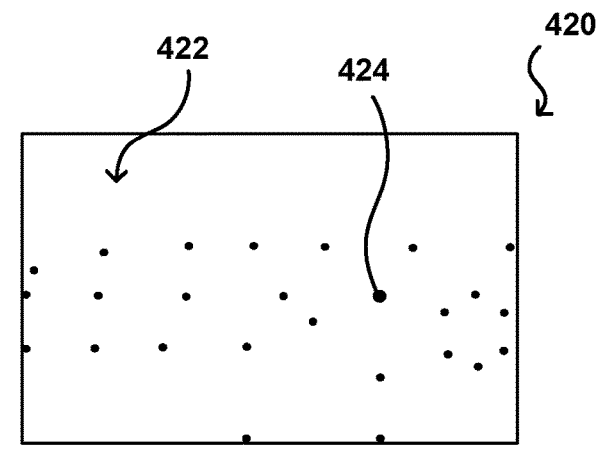

4A, for a given device image data may be captured that includes representations of various objects within a field of view of the camera or sensor, etc. In at least some embodiments, computer vision algorithms can be used to attempt to recognize objects, or at least differentiate between objects, in the image data and generate or determine representative data points. These points can correspond to unique or representative features, as known for computer vision applications. For a given image, a set of points can be generated as illustrated in the point set 420 of FIG. 4B, where the points can include feature points 422 and various anchor points 424, which can be used to identify specific objects in the scene. As known for various AR applications, anchor points can be used to identify surfaces or other contours or regions respect to which an AR element can be rendered. In various embodiments, each data point in the point set 420 can have coordinate data determined with respect to the device, such as an (x, y, z) or other coordinate set in two or three dimensions, which can be determined with respect to an axis having an origin at the sensor of the device. For example, an x value of 2.1 feet can correspond to 2.1 feet along the x direction from a camera sensor. In order to correlate the data from the various devices, the relative position and orientation of the devices can be determined. For example, the position data from FIG. 4B can be correlated to the gameplay field in FIG. 1A based on the determined position and orientation of the device as determined with respect to the gameplay field. Similar points than then be correlated, and an authoritative position for each point or object determined based on the correlated data.

Figure 4C:
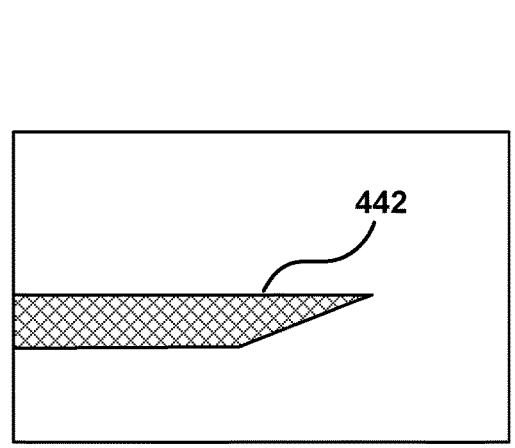
Figure 4D:
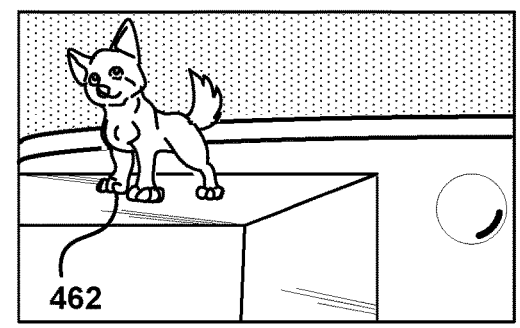

For various AR applications, it can be desirable to locate various surfaces, contours, or objects that can be used as reference points for rendering AR content. For example, various embodiments can attempt to locate surfaces, particularly relatively smooth and horizontal surfaces, that can serve as positioning locations for AR content. As an example, the data points from FIG. 4B (and potentially as aggregated or processed as discussed herein) can be analyzed to determine that there is a horizontal surface represented in the data. This can correspond to the box 404 or other such object represented in the image data. In response to detecting such a surface, and in some embodiments ensuring that various criteria are satisfied as may relate to size, angle, or smoothness, etc., a polygon 442 or other geometric shape or construct can be generated as illustrated in the example 440 of FIG. 4C. Information (e.g., coordinates) for this geometric construct can be determined on the device, or sent to the device, and used for placing rendered AR content. Sending geometric construct data can require much less bandwidth and memory than a full point cloud for a region, although in some embodiments point clouds can be used as well, or in place of the constructs. The constructs can have position and anchor points, for example, which can be used to define the location and shape of the construct. This relatively lightweight construct, definable using a relatively small set of points, allows for rapid adjustment in relative positioning based upon movement of a respective viewing device. This construct can be used as a reference for rendering AR content. As illustrated in the example image 460 of FIG. 4D, a live view of the gameplay field is displayed as captured by the camera. Based at least in part upon the position of the geometric construct, which would typically not actually be displayed on the screen but maintained as data in memory, can be used as a reference to render a character 462 or other AR element as an overlay with respect to the live view. As the device displayed the content changes position or orientation, the respective position of the geometric construct will change as well. This change can trigger a corresponding change in the rendering of the AR element 462, to maintain a consistent scale, position, and angle with respect to the geometric construct. In this example, the AR content can be rendered such that the dog is displayed to be standing on the box whenever the box is contained in (or near) a field of view of the camera of the device. While the dog or other character can move and perform various actions, its position in the gameplay field (or other such area) can be tracked with respect to at least one anchor point or construct, such that the rendering is consistent not only for a single device but across all devices accessing the AR content for that session and at or near that location.

As mentioned, in order to improve the realism of the augmented reality content it can be desirable to determine lighting state data for the scene that should be used to light or shade the AR object during the rendering process. The lighting state data can also provide the ability in at least some embodiments to adjust the appearance of the AR image, including the live view of the scene, by adjusting one or more aspects of the lighting state. In at least some embodiments, lighting state information, other than or in addition to that related to environment maps as discussed herein, can be obtained or determined using data from a number of different sources. One example source is the captured image data itself. The image data in some embodiments can be analyzed to determine information such as an average brightness and contrast value, or range of those values, for the image as a whole or a portion proximate a location for the AR content. The image data can also be analyzed to attempt to determine the direction of various shadows, such as by determining the longest axis or dimension of each shadow or dominant vector direction, to extrapolate the locations of various light sources that may not be represented in the image data. The image data can also be analyzed to attempt to determine light sources that are represented in the image data, and may analyze the locations of these light sources as represented in the captured image data while the camera (or device including the camera) undergoes orientation changes, such as rotations about an axis, and perform various geometric operations to attempt to determine the locations of those light sources. Other approaches to determining distance and position of objects can be used as well as discussed and suggested elsewhere herein.

Other types of information can be utilized as well. For example, a light sensor of the computing device may be used to determine an ambient light level for a scene, among other such values. Multiple light sensors, or sensors capable of determining values for different regions or directions, can also be used. In some embodiments, information about the time, location, date, and/or orientation of the device (or the camera on the device) can be used to calculate lighting information. For example, an outdoor scene during daylight hours may be primarily illuminated by sunlight. By knowing the geographic location and time of day, an estimate can be made as to the brightness of daylight available and the direction in which the sunlight is received, impacting shadows and other such aspects. Other information can be used to improve the accuracy as well, such as date information which can help to better determine the location of the sun relative to the scene. Information about the weather can also be used if available, and in some embodiments aspects of the image data can be used to determine lighting information. For example, if it is noon on a day when the sun should be directly overhead but the image data or data from the brightness sensor indicate that there is an unexpectedly low level of brightness or ambient light, then it can be assumed that it is a cloudy day or raining, etc. In some embodiments the image data can be analyzed to detect the presence of objects such as snow or water which can impact reflections, shadows, and overall brightness. Various other types of information can be analyzed or considered as well within the scope of the various embodiments.

The information about the various lighting sources, including position, intensity, color, and other such information, can be used to generate a light map for the scene. The light map in some embodiments can include a three-dimensional mapping of any or all determined sources of light that can contribute lighting to the scene. This can include light sources of one or more determined types in some embodiments, as may include the sun and light sources such as bulbs, LEDs, etc. In other embodiments this can include anything that can impact lighting and reflections, as may include snow, water, mirrors, bright objects, and the like. In addition to the position in three dimensions of a reference coordinate system, for example, information for each light source can be tracked and updated over time, such as whether the light source is active or appreciably contributing to the lighting of the scene. This can include, for example, the object having a relative brightness or other such aspect(s) that would impact the appearance of one or more objects in the scene, or the shadow(s) created by those objects. This can be based on a brightness or illumination threshold, or other such criterion. Other aspects such as the current color, intensity, or brightness can be tracked as well. For the sun, moon, or other mobile or non-stationary sources, the position information can also be updated over time as appropriate. Such a map can be used along with a cube map or other environment map to improve the appearance of the AR objects.

Figure 5:
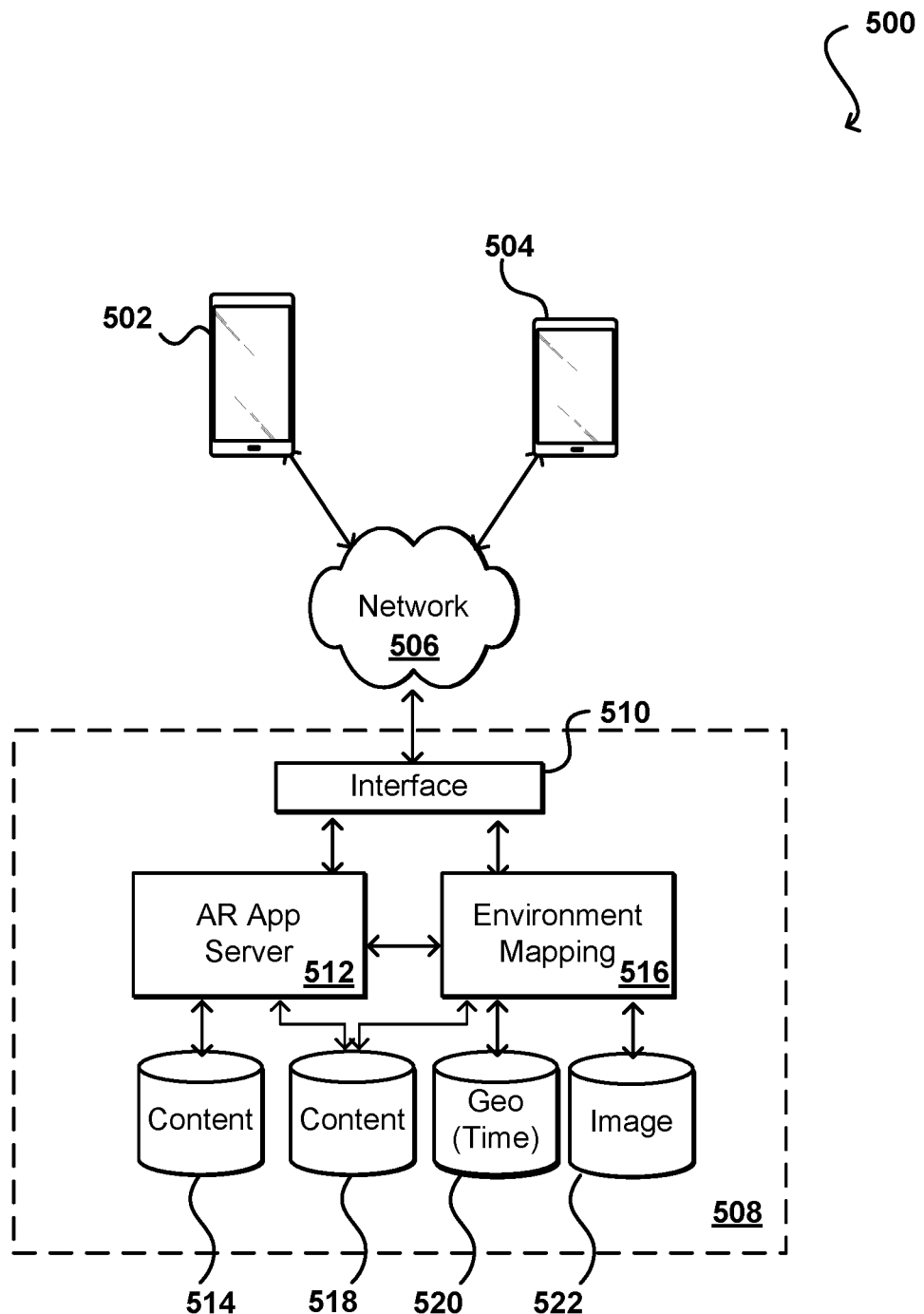
FIG. 5 illustrates an example system that can be used to generate, store, and share cube map data that can be utilized in accordance with various embodiments.

As mentioned, in various embodiments the environmental mapping can be performed on the individual devices for use in one or more AR applications executing on the device. In some embodiments at least some of the image, scene, or map data can be sent from various devices 502, 504 to a remote service environment 508, or other such system or service, as illustrated in the example system 500 of FIG. 5. While an augmented reality application server is discussed in this example, it should be understood that any service or set of resources dedicated or allocated to generating or managing environmental maps for use in augmented reality and/or other applications can be utilized as well within the scope of the various embodiments. In this example, an AR application, such as an augmented reality-inclusive game, is hosted on at least one application server 512. The application server 512 can be a local machine or a remote server operated by an application or content provider, among other such options. In this example the AR application supports the management of environment maps, such as cube maps, that can be utilized by players or users of the AR application. This can include generating and storing an environment map using data from a first player device 502, or generating a map using data from multiple devices 504, for use with the respective devices or any other device in a scene location corresponding to the environment map. The respective devices 502, 504 can connect to the application server 512 over at least one network 506, such as the Internet, a local area network, a dedicated gaming network, a peer-to-peer network, or a cellular network, among other such options and combinations thereof. The request can be received to an interface, such as an application programming interface (API) of an interface layer 510, which can cause the request to be directed to the application server 512. The application server 512 can then retrieve any appropriate content from a content repository and transmit the application content to the respective device(s). Alternatively, if the request or call from a device includes image or scene data, information for the request can be directed to an environment mapping service 516, system, or component, which can use the information to generate an environment map for that device. In still other embodiments the environment maps can be generated on the devices themselves, among other such options. As mentioned, generating such a map can include processing the received image data and stitching the processed images together to form an environment map, such as a cube map, that can then be sent back to the device for use in the AR application.

The environment mapping service 516 can receive image data from one of more devices, along with orientation data for each image, that can be stored to an image repository 522. This can enable the environment map to be updated or generated on demand, such as when a new session of the application is initiated or when the map is requested by an application on executing on another device. In at least some embodiments the generated environment maps will be stored to a map repository 518, and the image data used to generate those maps may remain stored in the image repository 522 for at least a period of time, or may be deleted once the environment map is generated. In some embodiments the environment may not receive the image data at all but instead might receive environment maps generated by the various device 502, 504, which can then be stored to the map data repository for subsequent retrieval by the same device or potentially other devices for that scene location.

As mentioned, the environment mapping service 516 can store maps or related data for subsequent retrieval by the same user or device, or for different users or devices for a similar scene location. In at least some embodiments the map data can include geographical data, such as geo-coordinates or other such data, that can be used to identify a location corresponding to an environment map. In some instances geographical data can also be received with the image and orientation data for use in more accurately generating an environment map. When a user device is to render AR content in a scene location, the device in some embodiments can first check with the application server 512 to determine whether an environment map exists and is stored in the map repository 518 that can be provided to the device for use in lighting the AR content, at least as a default map that the device can update or build from. In some embodiments other data might be used that can determine the map to provide as well. For example, the data might include time and/or date data, which can be used to select different versions of an environment map, or different environment maps, for the same scene location. For example, one map might be generated for a location during daylight hours, and another generated during night time hours. Storing the date and/or time information can enable the appropriate environment map to be provided for a received request. While a single map might be used with the brightness or colors adjusted, there may be different light sources (e.g., the sun) present during the day that are not present at night, and other light sources (e.g., lamps) that are active at night but typically not during the day, etc. Various other data can be used to select from multiple maps for a scene location in accordance with the various embodiments.

In some embodiments the AR application may relate to a multiplayer gaming application. For such embodiments, players can join in a session of the game with state data that is managed by a game state component of the application server. In some embodiments one or more game servers can execute the game, while in others the servers can manage game state for instances of the game executing on the various player devices. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the server at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices. This can include, for example, maintaining an authoritative point cloud, set of position information, or set of geometric constructs for a gameplay region, such as a room, area, or arena as discussed herein. The server can build up this information using data received from the various devices, and update the information based on updates to the received data. The server can maintain this point or construct data as part of the stored game state, and can send the information across the appropriate network(s) to the various devices as appropriate, such as may be based upon the location and orientation of the device, and the corresponding field of view for which AR content can be rendered. In other embodiments, however, the position or construct data can be sent between devices independent of the game server, either through the network or directly using a local communication protocol (e.g., Bluetooth or NFC). In situations where the data is sent between devices, the devices can either agree upon an authoritative data set or make local determinations for local rendering on the respective devices, among other such options.

As mentioned, the location for each device can be determined using an appropriate technology or mechanism, such as GPS, iBeacon, or signal triangulation, among other such options. Movement of the device or changes in orientation can be determined using any of a number of sensors or components of the devices themselves, such as may include an electronic compass, magnetometer, accelerometer, electronic gyroscope, altimeter, and the like. The object and position information can be determined from captured sensor data, where the sensors can include various camera sensors (IR, ambient, stereoscopic), structure light components, ultrasonic sensors, or LIDAR sensors, among others.

Figure 6:
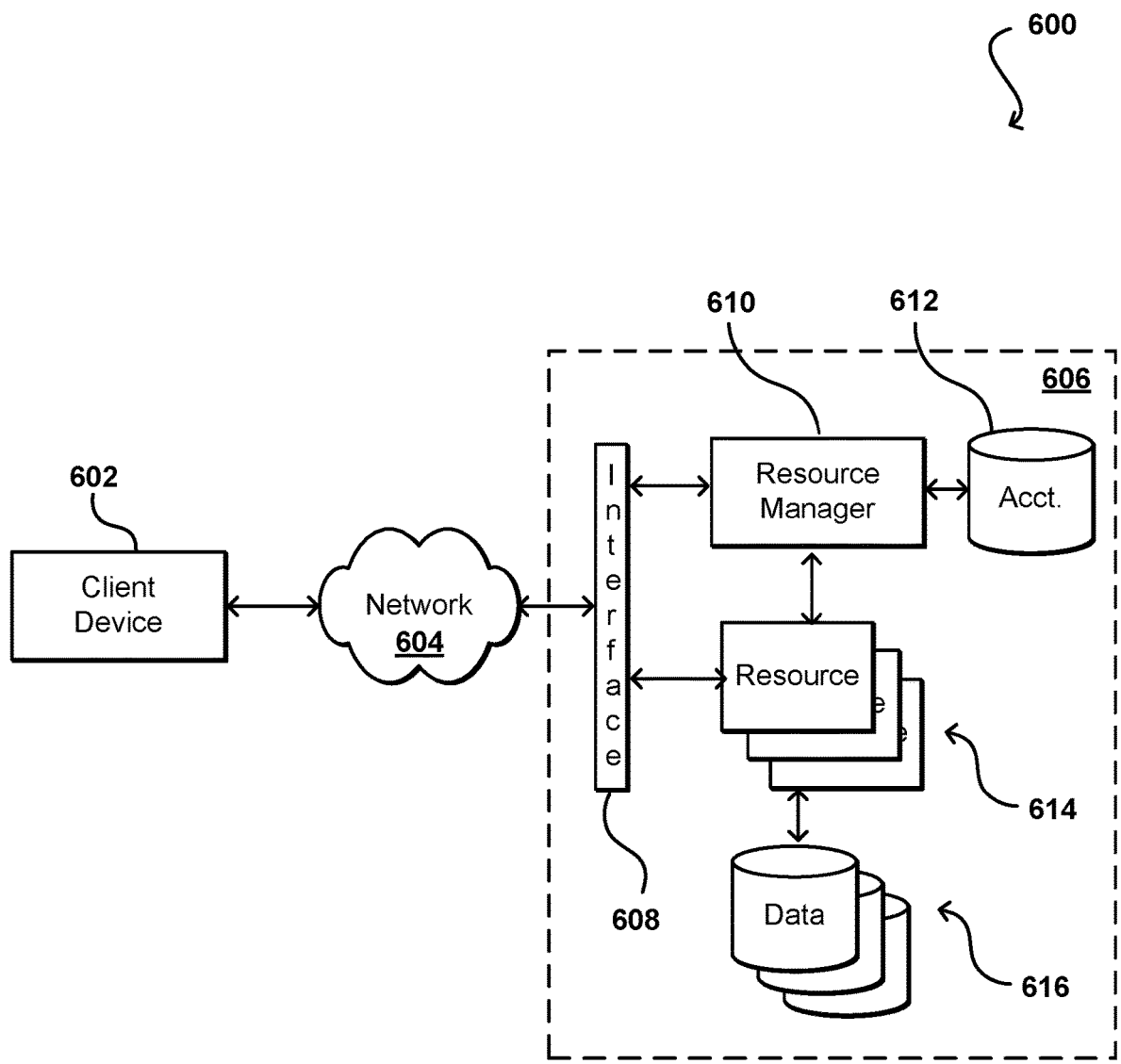
FIG. 6 illustrates an example environment in which various embodiments can be implemented.

FIG. 6 illustrates an example environment 600 in which aspects of the various embodiments can be implemented. In this example a user is able to utilize a client device 602 to submit requests across at least one network 604 to a multi-tenant resource provider environment 606. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 614 of one or more types. These types can include, for example, application servers operable to process instructions provided by a user or database servers operable to process data stored in one or more data stores 616 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 602 to communicate with an allocated resource without having to communicate with the resource manager 610, at least until such time as a relevant aspect of the user account changes, the user is no longer granted access to the resource, or another such aspect changes.

The resource manager 610 (or another such system or service) in this example can also function as a virtual layer of hardware and software components that handles control functions in addition to management actions, as may include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
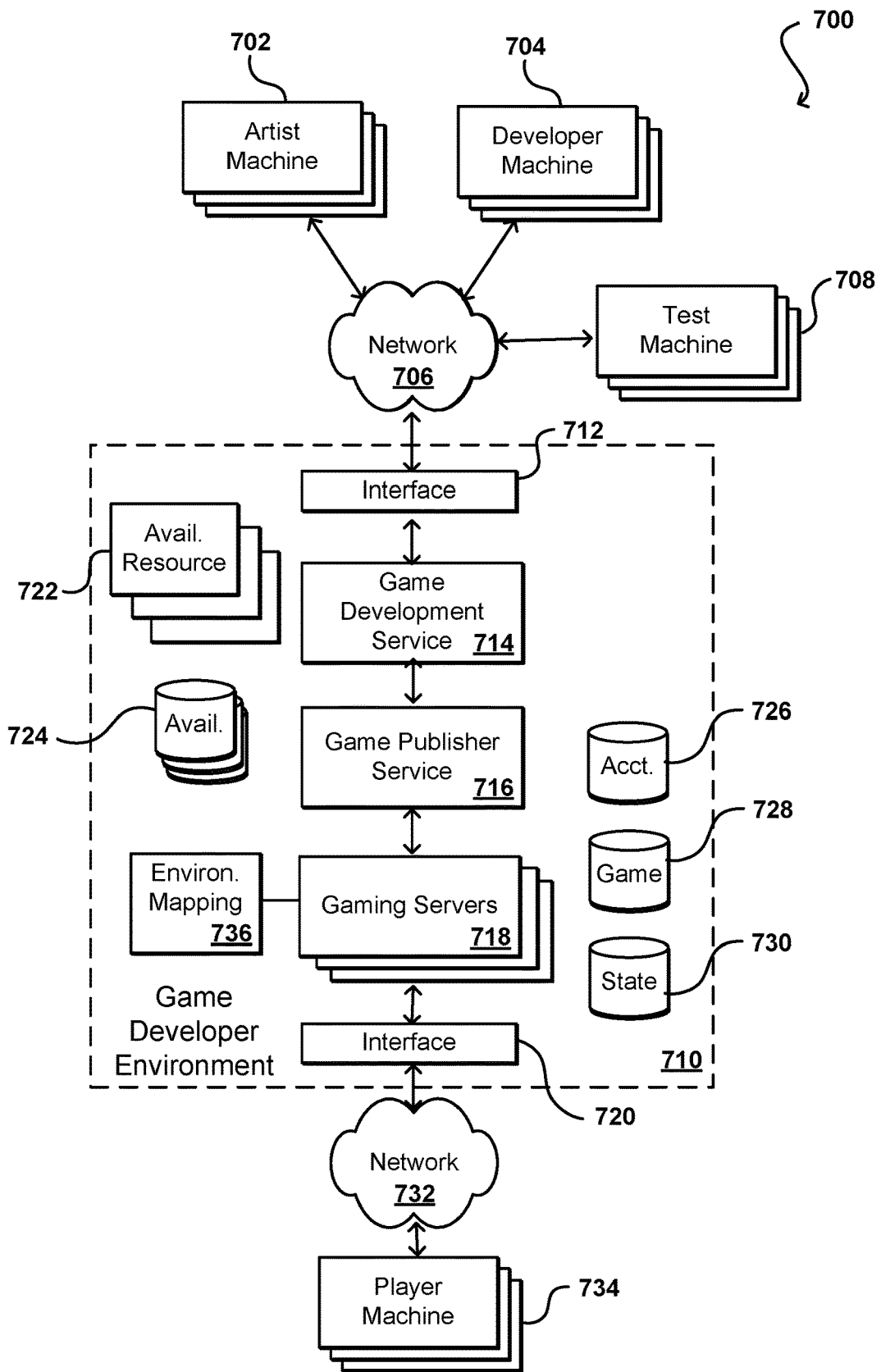
FIG. 7 illustrates an example gaming pipeline that can be used in accordance with various embodiments.

As illustrated in the example system 700 of FIG. 7, at least some of the resources can be used to support platforms and services useful in the development and providing of electronic gaming and three-dimensional graphical content, among other such options. For example, the artist machines 702 and developer machines 704 can collaborate via a game development service 714, which can be provided by a set of resources in a game developer environment 710, or other such resource environment, that are able to scale dynamically as discussed above. It should be understood that artists can fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 728, where the repositories can include graphics files, code, audio files, and the like. The game development service 714 can also work with an account manager, or at least maintain information in an account data store 726, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 716. The game publisher service 716 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 704 or otherwise. In some embodiments the game content might be published and made available to one or more test machines 708, which may be associated with the customer, such that the customer can test various builds or versions of the game. In some embodiments feedback provided by the test machines 708 may be provided to the game development service 714, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 718 which can run the game and enable player machines 734 to access the game content over one or more networks 732, which may be different from the network(s) 706 used for game development. This can include, for example, dedicated gaming networks, the Internet, cellular networks, and the like. The player machines 734 can communicate with the appropriate interfaces of an interface layer 720 to obtain the gaming content. In some embodiments the player machines 732 will download the gaming content for execution on the individual machines, and will upload (or otherwise communicate) gaming data, messages, and other information to the gaming servers 718, as well as to other players, social networking sites, or other such recipients. The gaming servers 718 can cause state information for the various instances of the game to be stored to at least one game state repository. This can hold state for the game as a whole or for individual game sessions, among other such options. As mentioned, in some embodiments the devices can send position or image data to a dedicated gaming server 718 or other component in the game developer environment 710, which can be aggregated and analyzed by a surface mapping component, or other such system or process, which can determine authoritative data for use in rendering augmented reality content. The authoritative data can include, for example, point cloud data, geometric primitives, location modeling, and the like. At least some of this data can be provided to the various player devices 734 in order for those devices to render the appropriate AR content for the location and orientation of a given device. In some embodiments the game content can be executed by the game servers and streamed in near real time to the player machines 734. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the gaming servers 718 or other such systems, services, or components can utilize a surface mapping service, for example, that is able to receive position, orientation, and object location data, among other types of data discussed herein, and generate an authoritative mapping of a specific area or region, such as a gameplay region. In this example, each player device 734 can send the information to an allocated gaming server 718 for the gaming session, which can then communicate the relevant information with the surface mapping service so that the surface mapping service can update the authoritative data set as appropriate, as well as to obtain from the mapping service any relevant position or other data that should be sent to one or more devices based on, for example, changes in the orientation or location of the device, as well as for changes of other objects or positions in the mapped region as well. As mentioned, in some embodiments the information can be sent as needed for a current view of a player device, and at least some of that data can be retained in cache or memory on the device such that only changes to the data need to be transmitted, and in some embodiments the devices can each build a model of the mapped region over time. As mentioned, in some embodiments the player devices 734 can communicate with each other as well, such as to send updates in player device location or orientation, or to communicate updates in the authoritative data set, among other such options. The player devices 734 can also send image, coordinate, and/or map data to an environment mapping service 736, which can generate, store, and/or manage environment maps for various devices or locations. As mentioned, in some embodiments the mapping service may receive environment maps generated on the various devices and then make those available for retrieval by the same or other devices for the respective scene locations.

Figure 8:
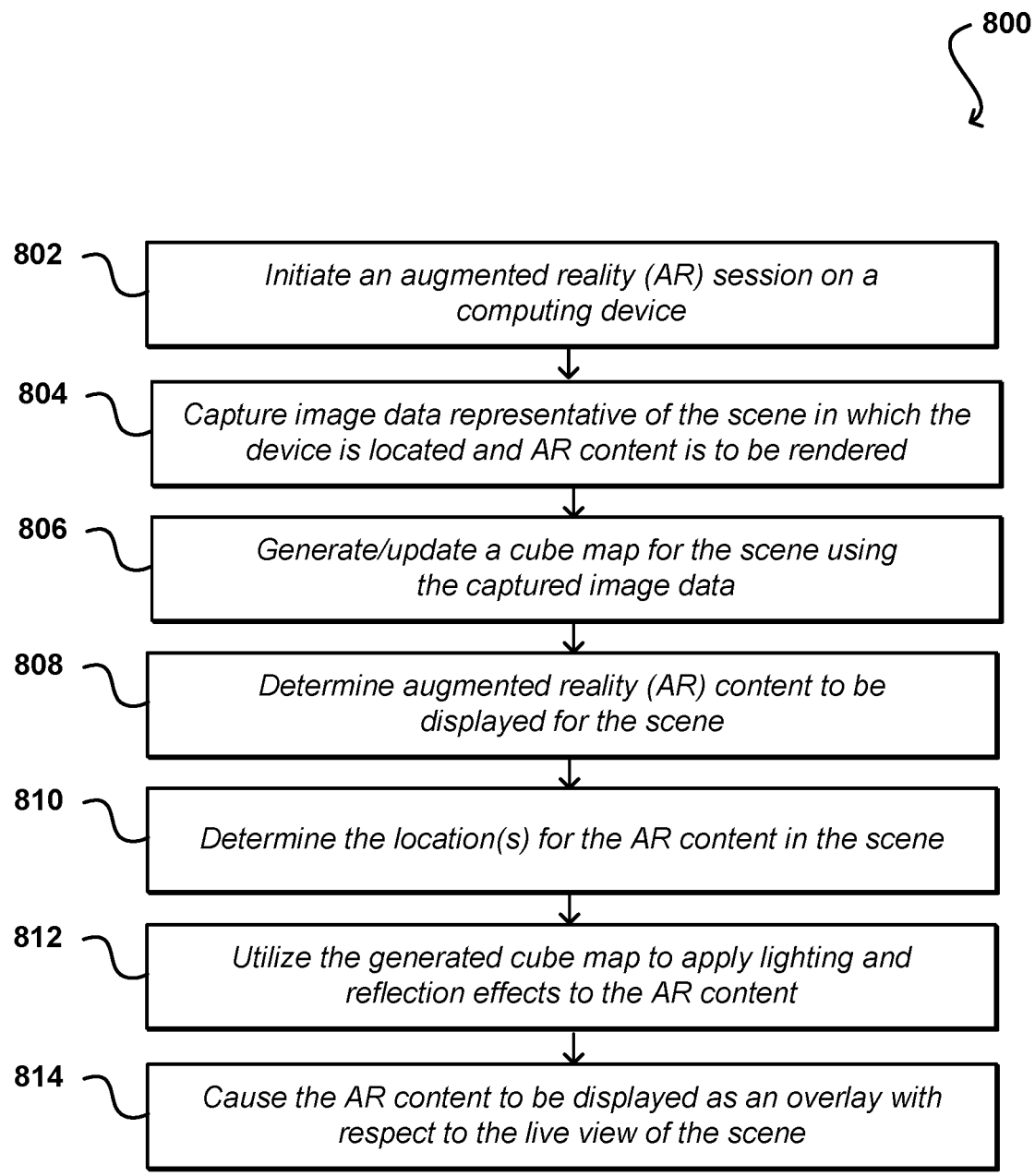
FIG. 8 illustrates an example process for utilizing a cube map with an augmented reality application that can be utilized in accordance with various embodiments.

FIG. 8 illustrates an example process 800 for utilizing a dynamically generated cube map to render augmented reality content that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well as discussed and suggested herein. In this example, an augmented reality (AR) session is initiated 802 on a computing device. This can include, for example, a user running an AR-inclusive application on the device or joining in a multiplayer online session, among other options discussed and suggested herein. In order to provide for the rendering of AR content, image data can be captured 804 that is representative of the scene in which the device is located and the AR content is to be rendered. For example, this can include representations of objects, surfaces, and other elements visible from a current location of the computing device or contained within a field of view of a camera of, or associated with, the computing device, among other such options. The image data can be associated with orientation and position data for the device, in order to correlate the field of view of the camera with a portion of the surrounding scene. A cube map, or other type of environment map as discussed elsewhere herein, can be generated 806 for the scene using the captured image data. This can include, for example, applying the image data to one or more faces of a cube map, or other environmental map, to provide a three-dimensional representation of the scene. If a cube map exists for the scene that is on, or accessible to, the computing device, this cube map can be updated using the captured image data. This can include filling out additional regions of the cube map or otherwise updating the image content of the cube map. The cube map can be stored locally on the device in at least some embodiments, whether in cache or on a local storage device.

Using a display mechanism for the computing device, such as a display screen or lenses of AR goggles, a live view of the scene can be displayed. This can include a live view of image or video data captured by the camera, or can include an actual view of the scene through a transparent portion of the display, among other such options. The AR content to be rendered with the live view can be determined 808, such as may be based upon a current orientation of the device or display, as well as a current state of the application or other such information. The AR content can include one or more virtual objects to be rendered for display over the live view such that the AR content appears to exist in the physical scene. The location(s) for the AR content in the scene can also be determined 810. As mentioned, this can include identifying surfaces or objects in the scene and then identifying appropriate locations for virtually positioning the AR content. The AR content to be rendered can be determined, such as by determining an appropriate wire mesh and texture map for a character to be rendered through AR. The generated cube map can be utilized 812 to apply lighting and reflection effects, as well as determine shadows and other visual aspects, for the AR content to be rendered. As discussed, this can include determining the normal for the various pixel locations of the AR object, and determining the specular color for each of those pixels based at least in part upon the impact of the image data of the cube map. The AR content can then be caused 814 to be displayed via the display device as an overlay with respect to the live view of the scene. As discussed, this can cause the AR content to appear, to a viewer of the display device, to correspond to physical objects present in the scene. Further as mentioned, the display mechanism may not be a part of the computing device doing the rendering but a separate display mechanism, such as an AR goggle peripheral or other such device. The process can continue to update the rendered content based on movements of the device, changes to the AR content through the application, or other such factors.

Figure 9:
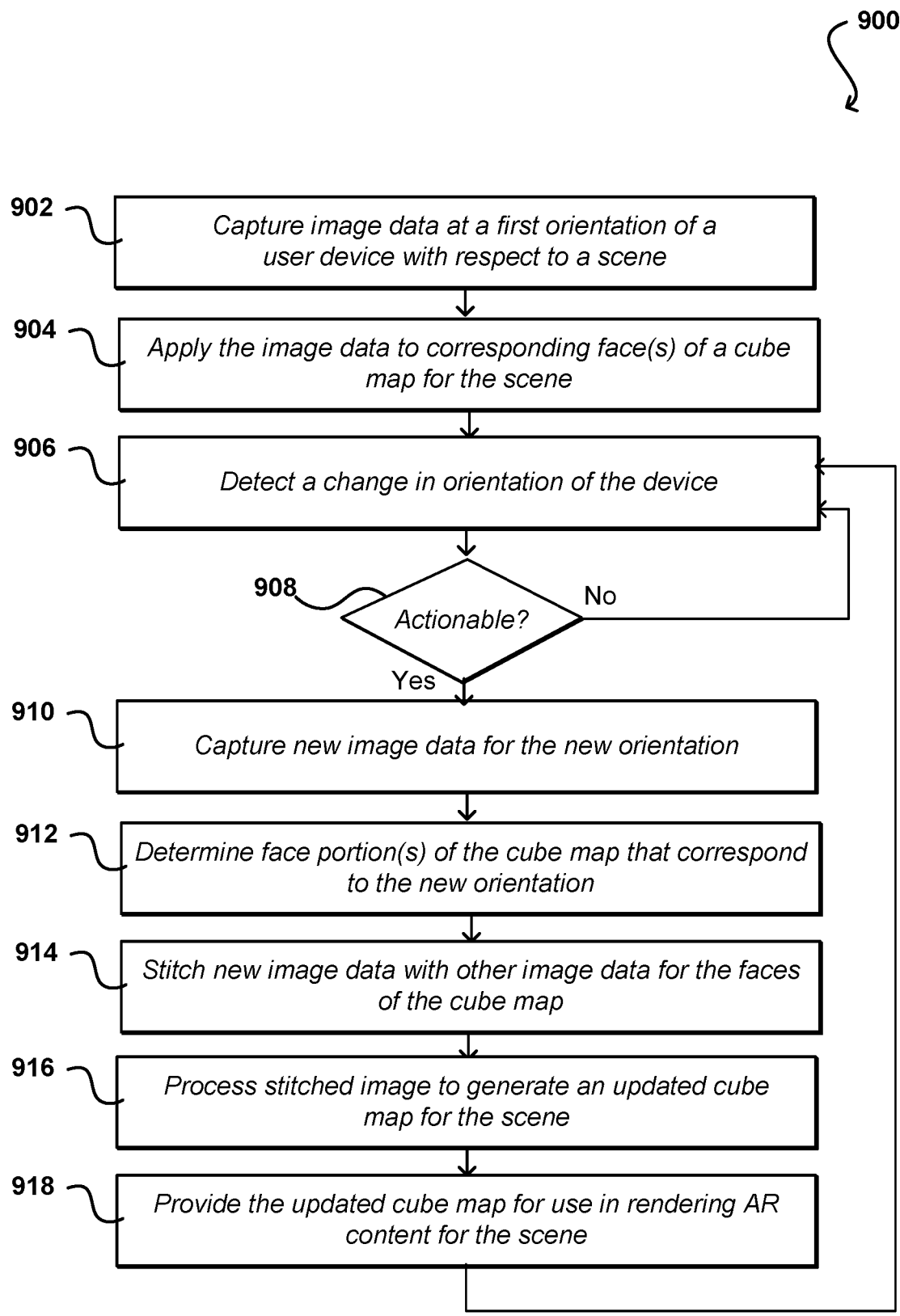
FIG. 9 illustrates an example process for dynamically generating a cube map for a scene that can be utilized in accordance with various embodiments.

FIG. 9 illustrates an example process 900 for dynamically generating a cube map that can be utilized in accordance with various embodiments. While a cube map is discussed for purposes of explanation, it should be understood that other types of environment maps, such as spheres or half-spheres, can be generated as well within the scope of the various embodiments. In this example, image data is captured 902 at a first orientation of a user device with respect to a scene. As discussed, this can include a default or initial orientation of a device that includes a camera for use with an augmented reality application in at least some embodiments. The image data can have any appropriate processing applied, and can have the orientation information used to determine a respective portion of the scene represented by the captured image data. The image data for that portion can then be applied 904 to one or more corresponding faces of the cube map for the scene. As mentioned the initial direction may serve as a default or reference direction that corresponds to a specific side face, but the orientation of the device at any orientation where a primary axis of the camera is not parallel to the ground can cause the image data to at least partially be applied to the upper or lower face, corresponding to the ceiling or floor of a room, for example. The relevant faces, or face portions, also can depend at least in part upon the relative sizes of the field of view of the camera and the faces of the cube map, as well as the location of the camera in the scene in at least some embodiments.

While the first image or video frame can be used to determine a region of the cube map, additional regions can be filled in over time with information captured by the camera at different orientations. In some embodiments different locations or zoom levels might also help the cube map to be filled in, such as where an image can be provided with further detail due to a zoom or translate, among other such options. In this example, determinations as to whether to update the cube map can be made based at least in part upon changes in orientation of the relevant device (or at least the camera of that device). A change in orientation of the device can be detected 906, such as by using a sensor of the device like a gyroscope or compass. In at least some embodiments the sensor will provide the angular change, or can provide information that can be used to determine the angular change or other measure of change in rotation. The extent of the change can then be analyzed to determine 908 whether the change is actionable. This can include, for example, determining whether an angular change meets or exceeds an actionable change threshold, such as at least three degrees from the last determined orientation. This can also include determining whether the camera is at an orientation or location such that at least a portion of the field of view of the camera corresponds to a portion of the cube map that has not yet been filled or updated with image data. In some embodiments there may be a temporal aspect to the updating of the cube map as well, such as updating the image data for the cube map every five minutes to reflect current lighting conditions. Various other criteria can be utilized as well as would be obvious to one of ordinary skill in the art in light of the teachings and suggestions contained herein. If the change in orientation is not actionable, then the process can continue without an updating of the cube map. In some embodiments the device could utilize the image data continuously or at some regular interval, but in at least some embodiments an attempt can be made to only perform an update when warranted in order to conserve resources, particularly for small and/or portable devices with limited resources.

If, however, it is determined that the change in orientation is actionable then new image data can be captured 910 for the new orientation. In some embodiments the image data for this orientation will already have been captured for the live view, and can instead be obtained for analysis. One or more face portions of the cube map for the scene can be determined 912 that correspond to the new or current orientation. As mentioned, this can be determined based at least in part upon the location of the device, the orientation of the device, and the field of view of the camera with respect to the scene, as well the orientation of the cube map relative to the physical scene. The new image data, or at least a relevant portion of the new image data, can be stitched 914 into an appropriate position with respect to the other image data, such that overlapping portions of the new image and existing image data are aligned and blended together to form a single, relatively seamless image that represents at least a respective portion of the scene. The stitched image can be processed 916 to generate an updated cube map for the scene. The processing can include appropriate image processing as discussed herein, which can include down sampling, blurring, filtering, smoothing, or other such processing. The processing can also include ensuring that the pixel values are mapped to the appropriate faces and locations of the cube map for the scene, among other such aspects. Once generated, the updated cube map can be provided 918 for use in rendering AR content for the scene, whether by device that provided the image data or another device rendering AR content for the scene, as part of the same application or a different application where permitted. The process can continue until a full cube map is generated in some embodiments, or can continue during the length of the session in order to update the cube map as lighting and other conditions for the scene change.

Figure 10:
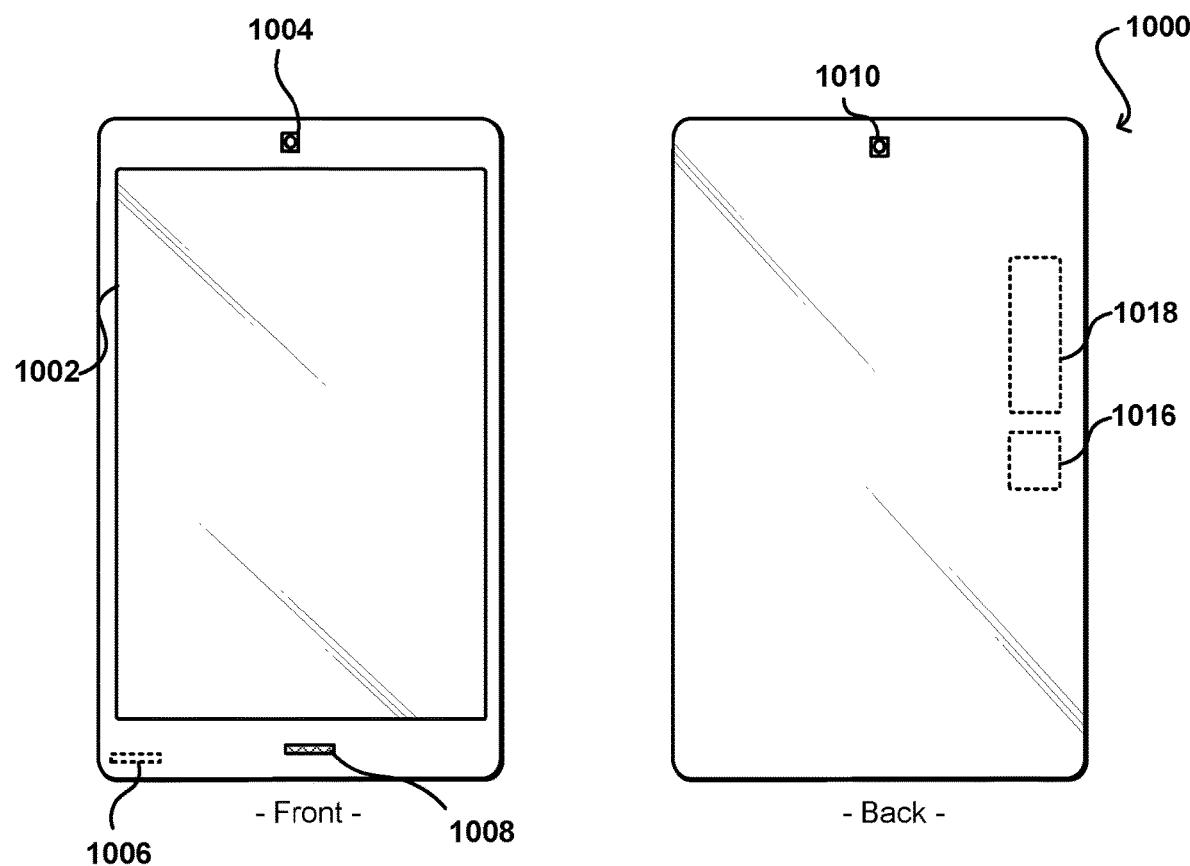
FIG. 10 illustrates an example computing device that can execute an augmented reality application in accordance with various embodiments.

FIG. 10 illustrates front and back views of an example electronic computing device 1000 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 1000 has a display screen 1002 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 1004 on the front of the device and at least one image capture element 1010 on the back of the device. It should be understood, however, that image capture elements could also, or alternatively, be placed on the sides or corners of the device, and that there can be any appropriate number of capture elements of similar or different types. Each image capture element 1004 and 1010 may be, for example, a camera, a charge-coupled device (CCD), a motion detection sensor or an infrared sensor, or other image capturing technology.

As discussed, the device can use the images (e.g., still or video) captured from the imaging elements 1004 and 1010 to generate a three-dimensional simulation of the surrounding environment (e.g., a virtual reality of the surrounding environment for display on the display screen of the device). Further, the device can utilize outputs from at least one of the image capture elements 1004 and 1010 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 1008 on the front side of the device. In some devices there may be only one microphone, while in other devices there might be at least one microphone on each side and/or corner of the device, or in other appropriate locations.

The device 1000 in this example also includes one or more orientation- or position-determining elements 1018 operable to provide information such as a position, direction, motion, or orientation of the device. These elements can include, for example, accelerometers, inertial sensors, electronic gyroscopes, and electronic compasses.

The example device also includes at least one communication mechanism 1006, such as may include at least one wired or wireless component operable to communicate with one or more electronic devices. The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

Figure 11:
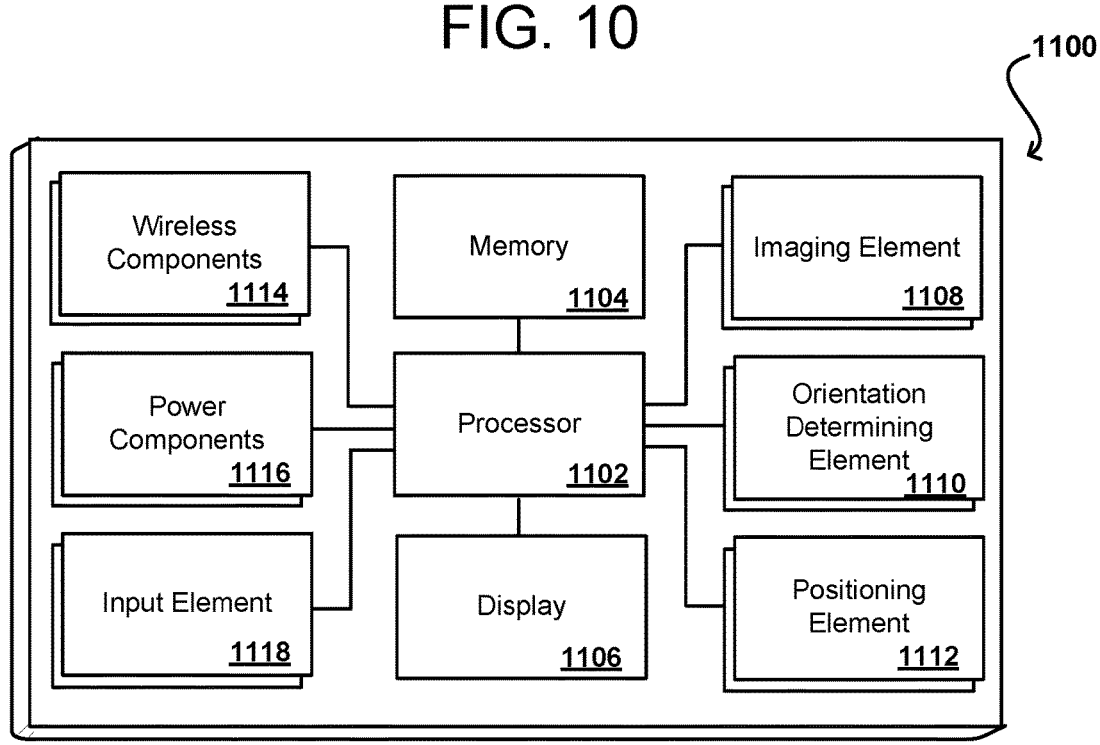
FIG. 11 illustrates example components of a computing device that can be used to implement aspects of the various embodiments.

FIG. 11 illustrates a set of basic components of an electronic computing device 1100 such as the device 1000 described with respect to FIG. 10. In this example, the device includes at least one processing unit 1102 for executing instructions that can be stored in a memory device or element 1104. As would be apparent to one of ordinary skill in the art, the device can include many types of memory, data storage, or computer-readable media, such as a first data storage for program instructions for execution by the processing unit(s) 1102, the same or separate storage can be used for images or data, a removable memory can be available for sharing information with other devices, and any number of communication approaches can be available for sharing with other devices.

The device typically will include some type of display screen 1106, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1108, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1100 also includes at least one orientation determining element 1110 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1100. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1112 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1114 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1116, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1118 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    capturing a first image using a camera of a computing device in a first orientation with respect to a scene;
    capturing a second image using the camera in a second orientation with respect to the scene;
    stitching the first image and the second image together to create an image representation of the scene with respect to a location of the computing device;
    generating a cube map using the image representation of the scene, the cube map being associated with the location at a first time and having a first resolution;
    determining the computer device is at the location at a second time, later than the first time;
    retrieving the cube map, the cube map providing one or more initial lighting effects;
    determining an augmented reality object to be rendered for display, by the computing device, with respect to the scene, the augmented reality object including features corresponding to representative feature points, represented using the cube map at the first resolution, the features having different properties associated with the rendering;
    capturing a third image, using the camera;
    determining current lighting conditions for the location, based at least in part on the third image;
    updating the cube map, based at least in part on the third image and the augmented reality object, to a second resolution greater than the first resolution, the features of the augmented reality object being represented at the second resolution based at least in part on the current lighting conditions and the respective properties of the features;
    applying one or more updated lighting effects to the augmented reality object using the updated cube map; and
    updating the updated cube map, based at least in part on the one or more updated lighting effects.

2. The computer-implemented method of claim 1, further comprising:
    applying the updated lighting effects at least in part by determining specular color values for pixels of the augmented reality object corresponding to virtual reflections of light from the cube map toward a viewpoint from which the augmented reality content is being rendered.

3. The computer-implemented method of claim 1, further comprising:
    detecting a change in orientation of the computing device to a third orientation; and
    causing at least a portion of a fourth image captured by the camera for the third orientation to be stitched into a region of the cube map not including image data from the first image or the second image.

4. The computer-implemented method of claim 1, further comprising:
    storing the cube map to at least one of the computing device or a remote data store for use in rendering augmented reality content in a subsequent session occurring with respect to the scene.

5. The computer-implemented method of claim 1, further comprising:
    providing the augmented reality object for display as an overlay element over a live view of the scene displayed on a display element of the computing device.

6. A computer-implemented method, comprising:
    capturing a set of images at different orientations of a camera;
    generating an environment map using the set of images, the environmental map associated with a location, the environment map having a first resolution;
    applying lighting effects to an augmented reality object based on the environment map, the augmented reality object including features corresponding to representative feature points, rendered using the environment map at the first resolution, the features having different properties associated with the lighting effects;
    capturing a second set of images at different orientations of the camera at the location;
    retrieving the environment map;
    updating the environment map, based at least in part on the second set of images and the augmented reality object;
    determining a change to the lighting effects with respect to the updated environmental map;

applying second lighting effects to a second augmented reality object, the second augmented reality object including second features corresponding to representative second feature points, rendered using the environment map at the first resolution, the second features having different properties associated with the second lighting effects; and updating the updated environment map, based at least in part on the second lighting effects, the updated environment map having a second resolution, the features of the second augmented reality object being rendered at the second resolution based at least in part on the second lighting effects and the respective properties of the features.

7. The computer-implemented method of claim 6, further comprising:

stitching together at least overlapping portions of at least a subset of the set of images to generate a three-dimensional image representation of a scene in which the camera is located; and generating the environment map at least in part by applying the three-dimensional image representation to a three-dimensional environment mesh.

8. The computer-implemented method of claim 7, further comprising:

selecting a three-dimensional environment mesh corresponding to a cube; and applying respective regions of the three-dimensional image representation to faces of the cube to generate the environment map.

9. The computer-implemented method of claim 6, further comprising:

obtaining orientation data for a computing device including the camera using at least one electronic sensor of the computing device; and utilizing the orientation data for the different orientations to determine how to position image data from the set of images into the environment map.

10. The computer-implemented method of claim 6, further comprising:

rendering the augmented reality object as an overlay element over a live view of a scene captured by the camera and displayed using a display device.

11. The computer-implemented method of claim 6, further comprising:

processing image data from the set of images, used to generate the environment map, by at least one of blurring, filtering, downsampling, or color matching.

12. The computer-implemented method of claim 6, further comprising:

applying the lighting effects at least in part by determining specular color values for pixels of the augmented reality object corresponding to virtual reflections of light from the environment map toward a viewpoint from which the augmented reality content is being rendered.

13. The computer-implemented method of claim 6, further comprising:

detecting a change in orientation of the camera to a new orientation; and causing at least a portion of image data captured by the camera for the new orientation to be stitched into a corresponding region of the environment map.

14. The computer-implemented method of claim 6, further comprising:

storing the environment map to at least one of a computing device, including the camera, or a remote data store for use in rendering augmented reality content in a subsequent session occurring with respect to a location for which the environment map is generated.

15. The computer-implemented method of claim 6, further comprising:

applying the lighting effects by performing projective texture mapping of the environment map onto a mesh for the augmented reality object.

16. A system, comprising:

at least one processor; and memory including instructions that, when executed by the at least one processor, cause the system to:

capture a set of images at different orientations of a camera;

generate an environment map using the set of images, the environmental map associated with a location, the environment map having a first resolution;

apply lighting effects to an augmented reality object based on the environment map, the augmented reality object including features corresponding to representative feature points, rendered using the environment map at the first resolution, the features having different properties associated with the lighting effects;

capture a second set of images at different orientations of the camera at the location;

retrieve the environment map;

update the environment map, based at least in part on the second set of images and the augmented reality object;

determine a change to the lighting effects with respect to the updated environmental map;

apply second lighting effects to a second augmented reality object, the second augmented reality object including second features corresponding to representative second feature points, rendered using the environment map at the first resolution, the second features having different properties associated with the second lighting effect; and update the updated environment map, based at least in part on the second lighting effects, the updated environment map having a second resolution, the features of the second augmented reality object being rendered at the second resolution based at least in part on the second lighting effects and the respective properties of the features.

17. The system of claim 16, wherein the instructions when executed further cause the system to:

stitch together at least overlapping portions of at least a subset of the set of images to generate a three-dimensional image representation of a scene in which the camera is located; and generate the environment map at least in part by applying the three-dimensional image representation to a three-dimensional environment mesh.

18. The system of claim 16, wherein the instructions when executed further cause the system to:

select a three-dimensional environment mesh corresponding to a cube; and apply respective regions of the three-dimensional image representation to faces of the cube to generate the environment map.

19. The system of claim 16, wherein the instructions when executed further cause the system to:

apply the lighting effects at least in part by determining specular color values for pixels of the augmented reality object corresponding to virtual reflections of light from the environment map toward a viewpoint from which the augmented reality content is being rendered.

20. The system of claim 16, wherein the instructions when executed further cause the system to:
  detect a change in orientation of the camera to a new orientation; and
  cause at least a portion of image data captured by the camera for the new orientation to be stitched into a corresponding region of the environment map.

* * * * *